US 8,662,054 B2

(12) United States Patent
Omura

(10) Patent No.: US 8,662,054 B2
(45) Date of Patent: Mar. 4, 2014

(54) ENGINE CONTROL DEVICE

(75) Inventor: Tetsuo Omura, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 354 days.

(21) Appl. No.: 13/255,471

(22) PCT Filed: Mar. 9, 2011

(86) PCT No.: PCT/JP2011/055541
§ 371 (c)(1),
(2), (4) Date: Sep. 8, 2011

(87) PCT Pub. No.: WO2012/120668
PCT Pub. Date: Sep. 13, 2012

(65) Prior Publication Data
US 2012/0227704 A1    Sep. 13, 2012

(51) Int. Cl.
*F02B 31/00*        (2006.01)
*F02B 31/04*        (2006.01)

(52) U.S. Cl.
USPC ............................................... 123/306

(58) Field of Classification Search
USPC .............. 123/76, 295, 302, 306, 308, 309,
123/406.26, 406.45, 435; 324/380, 382,
324/399; 701/103, 106, 111
See application file for complete search history.

(56) References Cited

U.S. PATENT DOCUMENTS

| | | | |
|---|---|---|---|
| 6,006,718 A * | 12/1999 | Ishihara et al. | 123/295 |
| 6,330,510 B1 * | 12/2001 | Takaku et al. | 701/114 |
| 6,484,690 B2 * | 11/2002 | Tokuyasu et al. | 123/301 |
| 6,668,792 B2 * | 12/2003 | Yamauchi et al. | 123/295 |
| 6,976,468 B2 * | 12/2005 | Nakayama et al. | 123/295 |
| 7,051,702 B2 * | 5/2006 | Sakai et al. | 123/308 |
| 2003/0111025 A1 | 6/2003 | Kim | |

FOREIGN PATENT DOCUMENTS

| | | | |
|---|---|---|---|
| JP | 2003-172140 A | 6/2003 |
| JP | 2005-180247 A | 7/2005 |
| JP | 2008-303798 A | 12/2008 |
| JP | 2009-150275 A | 7/2009 |

* cited by examiner

*Primary Examiner* — Stephen K Cronin
*Assistant Examiner* — Elizabeth Hadley
(74) *Attorney, Agent, or Firm* — Sughrue Mion, PLLC

(57) ABSTRACT

An ECU 70 is provided to an engine 50 including a TCV 57 that changes a tumble flow generated inside a cylinder and being configured to be capable of securing a cooling of a cylinder block 51 and suppressing an occurrence of a cooling loss in a cylinder head 52. The ECU 70 includes a control unit that feedback-controls the TCV 57 based on a primary blow-off voltage Vi so that a flow velocity of air flowing along a surface on the cylinder head 52 side becomes greater than a flow velocity of air flowing along a surface on the piston 53 side in a case where a flow velocity of air flowing along a surface on one of the cylinder head 52 side and the piston 53 side becomes greater than a flow velocity of air flowing along a surface on another side in the cylinder.

1 Claim, 10 Drawing Sheets

ENGINE CONTROL DEVICE

CROSS REFERENCE TO RELATED APPLICATIONS

This application is a National Stage of International Application No. PCT/JP2011/055541, filed on Mar. 9, 2011, the contents of all of which are incorporated herein by reference in their entirety.

TECHNICAL FIELD

The present invention relates to an engine control device.

BACKGROUND ART

An engine is generally cooled. In addition, there is a case that a tumble flow is generated inside a cylinder in the engine. A technique to change the tumble flow generated inside the cylinder is disclosed in Patent Document 1 for example.
[Patent Document 1] Japanese Patent Application Publication No. 2005-180247

DISCLOSURE OF THE INVENTION

Problems to be Solved by the Invention

The engine is cooled to prevent an occurrence of knocking for example. However, if it is cooled more than necessary, a cooling loss increases. As a result, a decrease in heat efficiency, which means an increase in fuel consumption, is lead. Therefore, when cooling the engine, it is desirable to suppress the occurrence of the cooling loss as much as possible and to ensure the cooling performance of the engine by cooling it as needed.

The amount of cooling loss varies according to the manner of heat release from the inside of the cylinder. In addition, the tumble flow also affects the manner of heat release from the inside of the cylinder. Therefore, in order to prevent the occurrence of the cooling loss, it is desirable to consider the manner of heat release from the inside of the cylinder by the tumble flow in addition to the manner of cooling an engine.

The present invention was made in view of the above problems, and has an object of providing an engine control device capable of ensuring a cooling performance of an engine while preventing an occurrence of a cooling loss properly by considering the manner of heat release from an inside of a cylinder by the tumble flow.

Means for Solving the Problems

The present invention is an engine control device including: a control unit that feedback-controls the tumble flow change unit based on a parameter capable of indicating a flow velocity of air flowing through an inside of the cylinder so that a flow velocity of air flowing along a surface on a cylinder head side becomes greater than a flow velocity of air flowing along a surface on a piston side in a case where a flow velocity of air flowing along a surface on one of the cylinder head side and the piston side becomes greater than a flow velocity of air flowing along a surface on another side in the cylinder.

The present invention may be configured so that a spark plug is provided to the cylinder head to face the inside of the cylinder, and the control unit feedback-controls the tumble flow change unit based on a discharge voltage when a discharge of the spark plug is blown off by the tumble flow generated inside the cylinder for the first time.

Effects of the Invention

According to the present invention, it is possible to ensure the cooling performance of an engine while suppressing an occurrence of a cooling loss properly by additionally considering a manner of heat release from an inside of a cylinder by the tumble flow.

MODES FOR CARRYING OUT THE INVENTION

A description will now be given of an embodiment of the present invention with reference to drawings.

Figure 1:
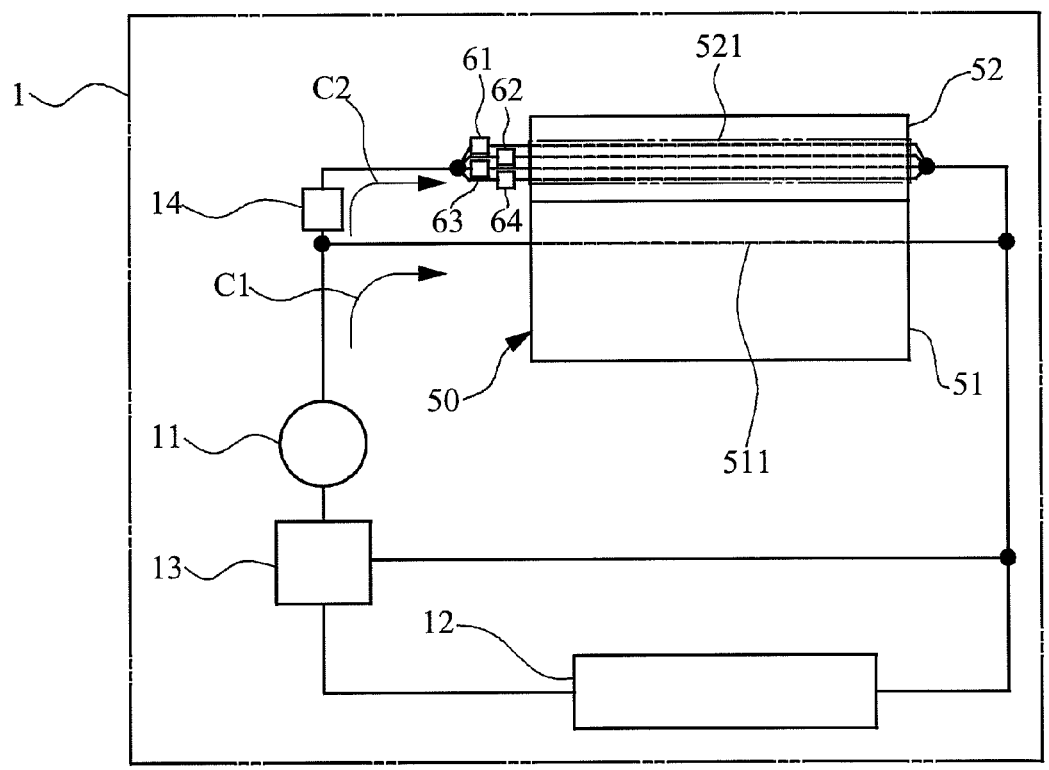
FIG. 1 is a schematic structure diagram of an engine cooling device.

An engine cooling device 1 (hereinafter, referred to as a cooling device) illustrated in FIG. 1 is mounted in a vehicle not illustrated, and is provided with a water pump (hereinafter, referred to as a W/P) 11, a radiator 12, a thermostat 13, a flow rate adjusting valve 14, an engine 50, and first through fourth partial flow rate adjusting valves 61 through 64. The W/P 11 corresponds to a cooling medium pumping unit, and is a variable W/P that pumps cooling water which is a cooling medium, and varies a flow rate of pumped cooling water. The cooling water pumped by the W/P 11 is supplied to the engine 50.

The engine 50 is provided with a cylinder block 51 and a cylinder head 52. A block-side water jacket (hereinafter, referred to as a block-side W/J) 511 corresponding to a first cooling medium path is formed in the cylinder block 51. The block-side W/J 511 forms one system of a cooling system in the cylinder block 51. A head-side water jacket (hereinafter, referred to as a head-side W/J) 521 corresponding to a second cooling medium path is formed in the cylinder head 52. The head-side W/J 521 forms multiple (here, four) different cooling systems in the cylinder head 52. The cooling water pumped by the W/P 11 is supplied to the block-side W/J 511 and the head-side W/J 521, specifically.

Cooling water circulation paths are formed in the cooling device 1. A block-side circulation path C1 in which the block-side W/J 511 is mounted for example is an example of the cooling water circulation path. The cooling water flowing through the block-side circulation path C1 flows through the block-side W/J 511 after being discharged from the W/P 11, and goes back to the W/P 11 via the thermostat 13 or via the radiator 12 and the thermostat 13.

In addition, a head-side circulation path C2 in which the head-side W/J 521 is mounted for example is an example of the cooling water circulation path. The cooling water flowing through the head-side circulation path C2 flows through the flow rate adjusting valve 14, at least one of first through fourth partial flow rate adjusting valves 61 through 64, and at least one of four cooling systems formed by the head-side W/J 521 after being discharged from the W/P 11, and goes back to the W/P 11 via the thermostat 13 or via the radiator 12 and the thermostat 13.

The radiator 12 is a heat exchanger, and cools the cooling water by performing heat transfer between the flowing cooling water and the air. The thermostat 13 switches the flowing path which is communicated with the W/P 11 from the entrance side. More specifically, when the temperature of the cooling water is smaller than a given value, the thermostat 13 makes the flowing path which bypasses the radiator 12 be in a communication state, and when the temperature of the cooling water is equal to or greater than the given value, the thermostat 13 makes the flowing path passing through the radiator 12 be in a communication state.

The flow rate adjusting valve 14 is located posterior to the point where circulation paths C1 and C2 are separated, and upstream of the cylinder head 52 in the head-side circulation path C2, and more specifically, is located upstream of first through fourth partial flow rate adjusting valves 61 through 64.

The flow rate adjusting valve 14 functions as a cooling capacity adjustment unit that can adjust the cooling capacity of the cylinder head 52. More specifically, the flow rate adjusting valve 14 functions as the cooling capacity adjustment unit that can totally adjust the cooling capacity of the cylinder head 52 by adjusting the flow rate of the cooling water flowing through the head-side W/J 521 totally.

In addition, the flow rate adjusting valve 14 located as described above functions as the cooling capacity adjustment unit that can suppress the cooling capacity of the cylinder head 52 while securing the cooling of the cylinder block 51. More specifically, the flow rate adjusting valve 14 functions as the cooling capacity adjustment unit that can suppress the cooling capacity of the cylinder head 52 without suppressing the cooling capacity of the cylinder block 51.

The flow rate adjusting valve 14 functions as the cooling capacity adjustment unit that can suppress the cooling capacity of the cylinder head 52 without suppressing the cooling capacity of the cylinder block 51 in a case where the cooling capacity of the cylinder block 51 and the cooling capacity of the cylinder head 52 at the high-rotation/high-load time at which the cooling water flows through the cylinder block 51 and the cylinder head 52 exist.

In addition, the flow rate adjusting valve 14 provided as described above functions as the cooling capacity adjustment unit that can adjust the flow rate of the cooling water flowing through the block-side W/J 511 so that it increases the cooling capacity of the cylinder block 51 when the flow rate of the cooling water flowing through the head-side W/J 521 is adjusted so that the cooling capacity of the cylinder head 52 is suppressed.

First through fourth partial flow rate adjusting valves 61 through 64 are located between the flow rate adjusting valve 14 and the cylinder head 52 in the head-side circulation path C2 so as to correspond to four cooling systems formed by the head-side W/J 521. Partial flow rate adjusting valves 61 through 64 function as the cooling capacity adjustment unit that can adjust the cooling capacity of the cylinder head 52, and more specifically, function as the cooling capacity adjustment unit that can partially adjust the cooling capacity of the cylinder head 52 by partially adjusting the flow rate of the cooling water flowing through the head-side W/J 521.

In the cooling device 1, the cooling water flowing through the block-side circulation path C1 is made not to flow through the head-side W/J 521 during the circulation after being pumped by the W/P 11. In addition, in the cooling device 1, the cooling water flowing through the head-side circulation path C2 is made not to flow through the block-side W/J 511 during the circulation after being pumped by the W/P 11. That is to say, in the cooling device 1, the block-side W/J 511 and the head-side W/J 521 are mounted in different cooling medium circulation paths.

Figure 2:
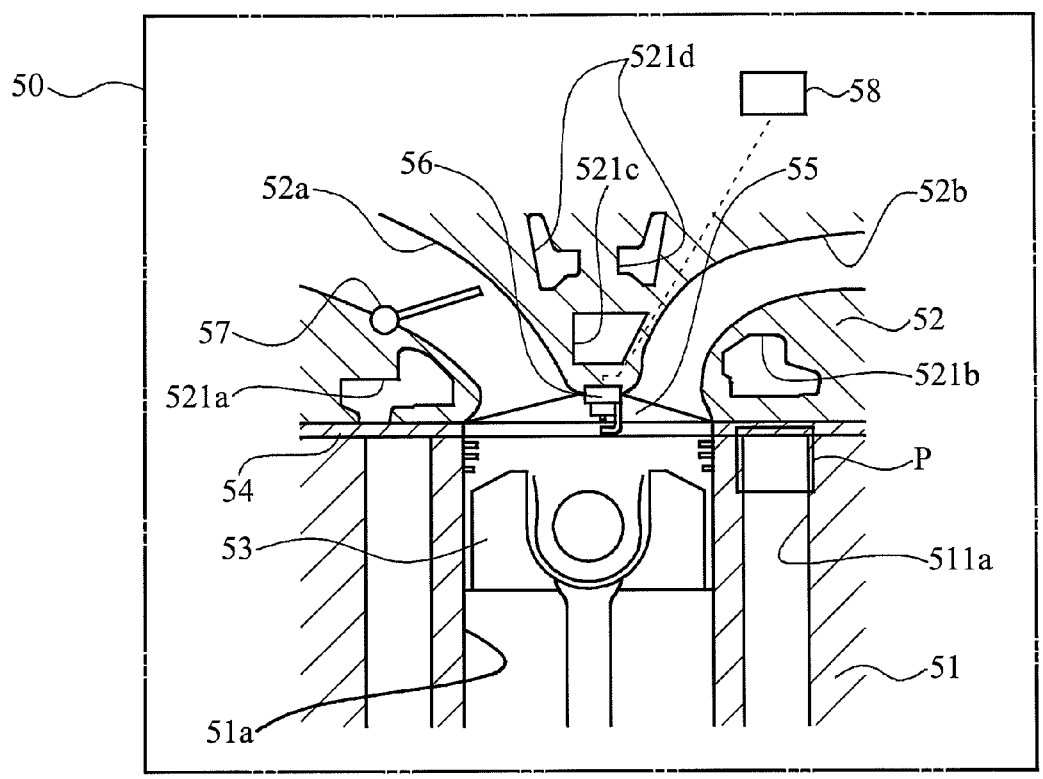
FIG. 2 is a schematic structure diagram of an engine.

A description will now be given of the engine 50 more specifically. As illustrated in FIG. 2, a cylinder 51a is formed in the cylinder block 51. A piston 53 is provided to the cylinder 51a. The cylinder head 52 is fixed to the cylinder block 51 via a gasket 54 having high heat-insulating properties. The gasket 54 suppresses the heat transfer from the cylinder block 51 to the cylinder head 52 with its high heat-insulating properties. The cylinder 51a, the cylinder head 52 and the piston 53 form a combustion chamber 55. An intake port 52a which leads the intake air to the combustion chamber 55 and an exhaust port 52b which exhausts the combustion gas from the combustion chamber 55 are formed in the cylinder head 52. A spark plug 56 is provided to the cylinder head 52 so that it faces the almost upper center of the combustion chamber 55.

The block-side W/J 511 is provided with a partial W/J 511a which is a first partial cooling medium path, specifically. The partial W/J 511a is provided in the vicinity of the cylinder 51a, specifically. The upstream portion P of the partial W/J 511a is provided so as to correspond to the area, which the intake-air flowing into the cylinder (the combustion chamber 55) strikes, of the wall surface of the cylinder 51a. The engine 50 is an engine generating the tumble flow inside the cylinder, and more specifically, the area which the intake air flowing into the cylinder strikes is an upper and exhaust-side area of the wall surface of the cylinder 51a.

The head-side W/J 521 is provided with a partial W/J 521a, a partial W/J 521b, a partial W/J 521c and a partial W/J 521d that are second partial cooling medium paths, specifically. The partial W/J 521a is located in a vicinity of the intake port 52a, the partial W/J 521b is located in a vicinity of the exhaust port 52b, and the partial W/J 521c is located in a vicinity of the spark plug 56. The partial W/J 521d is provided so as to cool the region between intake/exhaust ports 52a and 52b, and other regions.

The partial W/J 521a through the partial W/J 521d are mounted in four cooling systems formed by the head-side W/J 521 separately. The first partial flow rate adjusting valve 61 is provided to correspond to the partial W/J 521a, the second partial flow rate adjusting valve 62 is provided to correspond to the partial W/J 521b, the third partial flow rate adjusting valve 63 is provided to correspond to the partial W/J 521c, and the fourth partial flow rate adjusting valve 64 is provided to correspond to the partial W/J 521d.

The engine 50 is further provided with a TCV (tumble control valve) 57. The TCV 57 is provided to the intake port 52a. The TCV 57 changes the flow of the intake air flowing into the cylinder. According to this, the tumble flow generated inside the cylinder can be changed. More specifically, the TCV 57 increases the flow speed of the intake air by operating to the direction in which the intake port 52a is closed. This strengthens the tumble flow. On the other hand, the TCV 57 decreases the flow speed of the intake air by operating to the direction in which the intake port 52a is opened. This weakens the tumble flow. The TCV 57 corresponds to the tumble flow change unit.

Figure 3:
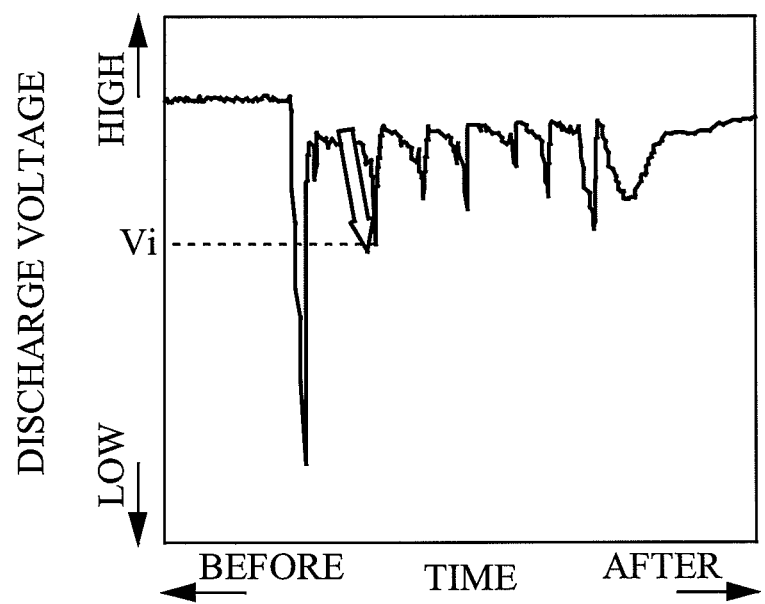
FIG. 3 is a diagram illustrating an example of change of discharge voltage of a spark plug.

The engine 50 is further provided with a discharge voltage detection unit 58. The discharge voltage detection unit 58 is an electronic circuit for example, and detects the discharge voltage of the spark plug 56. FIG. 3 is a diagram illustrating an example of the change of the discharge voltage of the spark plug 56. The vertical axis represents the discharge voltage, and the horizontal axis represents time.

The discharge occurs when a certain high voltage at which the insulation breakdown occurs is applied between electrodes of the spark plug 56. The discharge occurring at this time is a capacitive discharge, and in a discharge process by the capacitive discharge, the discharge voltage is sharply decreased when the current flows between electrodes. In addition, the discharge voltage rises again when the insulated condition is achieved between electrodes. As a result, the discharge process by the inductive discharge starts.

In the engine 50 generating the tumble flow inside the cylinder, there is a case that the tumble flow blows off the discharge in the discharge process by the inductive discharge. This repeats the insulated condition between electrodes and the re-rise of the discharge voltage. The discharge voltage detection unit 58 detects the discharge voltage which changes as described, and detects a primary blow-off voltage Vi which is a discharge voltage of when the discharge which progresses as illustrated with an arrow is blown off by the tumble flow for the first time in the discharge process by the inductive discharge.

Figure 4:
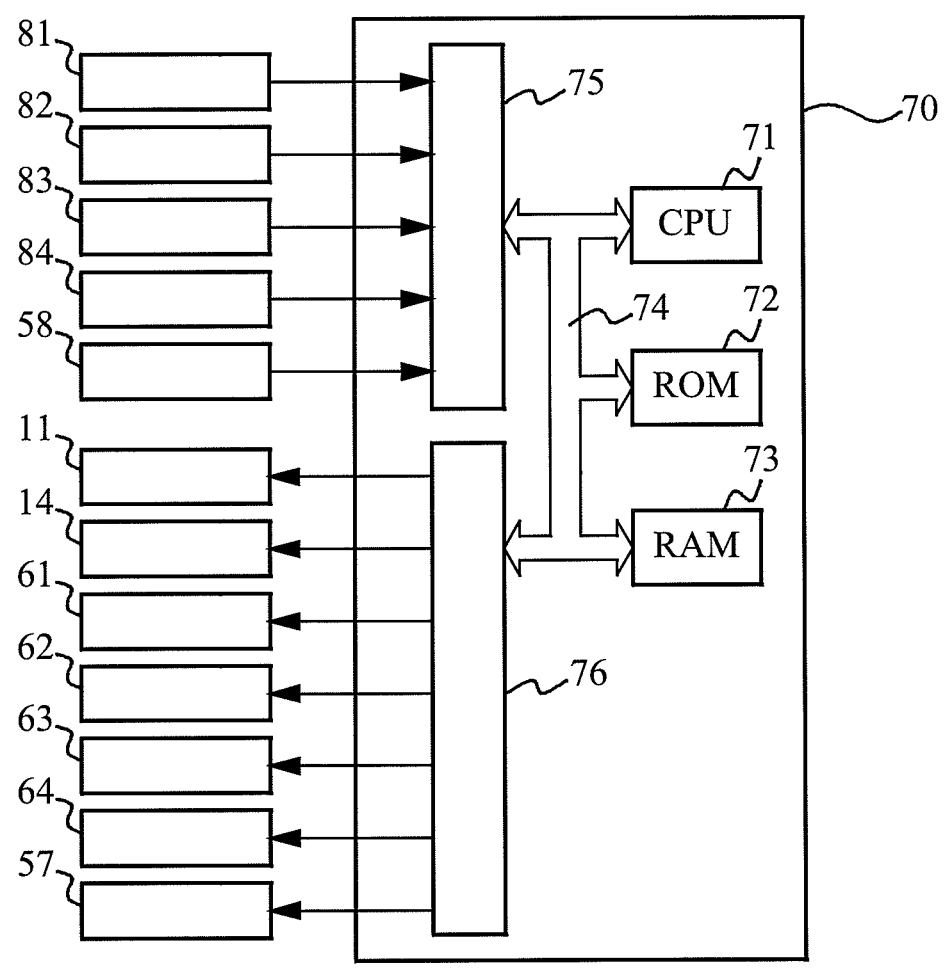
FIG. 4 is a schematic configuration diagram of an ECU.

Furthermore, the cooling device 1 is provided with an ECU 70 illustrated in FIG. 4. The ECU 70 is an electronic control device corresponding to an engine control device, and is provided with a microcomputer composed of a CPU 71, a ROM 72, a RAM 73 and the like, and input/output circuits 75 and 76. These components are connected each other via a bus 74.

Various sensors and switches, such as a crank angle sensor 81 for detecting the rotation number of the engine 50, an air flow meter 82 for measuring an intake air amount, an accelerator opening degree sensor 83 for detecting an accelerator opening degree, a water temperature sensor 84 for detecting the temperature of the cooling water, and the discharge voltage detection unit 58, are electrically connected to the ECU 70. The load on the engine 50 is detected by the ECU 70 based on outputs from the air flow meter 82 and the accelerator opening degree sensor 83. In addition, various controlled objects, such as the W/P 11, the flow rate adjusting valve 14, first through fourth partial flow rate adjusting valves 61 through 64, and the TCV 57, are electrically connected to the ECU 70.

The ROM 72 is a component to store programs where various processes executed by the CPU 71 are written, and map data. Functional units are achieved in the ECU 70 by the execution of the process by the CPU 71 based on programs stored in the ROM 72 with using a temporary memory region of the RAM 73 as needed. First through third control units described later are functionally achieved in the ECU 70. First through third control units may be achieved in different electronic control devices separately.

The first control unit executes the control to suppress the cooling capacity of the cylinder head 52. More specifically, the first control unit executes a control to suppress the cooling capacity of the cylinder head 52 when the operation state of engine is a high-load. More specifically, the first control unit executes a control to suppress the cooling capacity exerted based on the head-side W/J 521 by controlling the flow rate adjusting valve 14 when the operation state of engine is a low-rotation/high-load.

Figure 5:
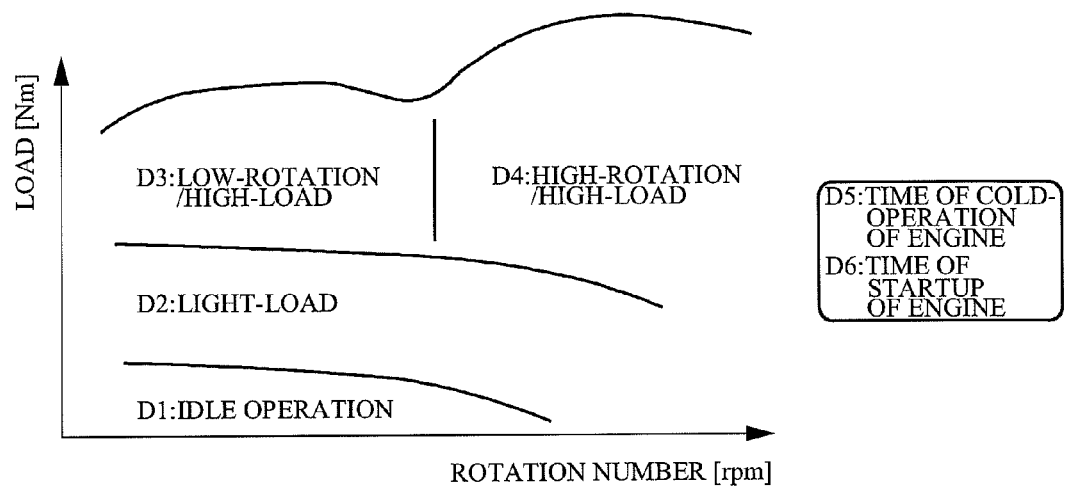
FIG. 5 is a diagram schematically illustrating a classification of operation state of an engine.
Figure 6A:
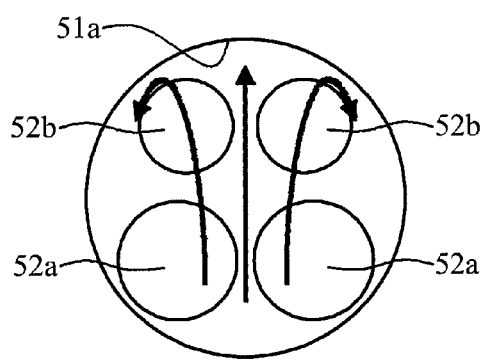
FIG. 6(a) through FIG. 6(d) are diagrams illustrating a flowing manner of the tumble flow.
Figure 6C:
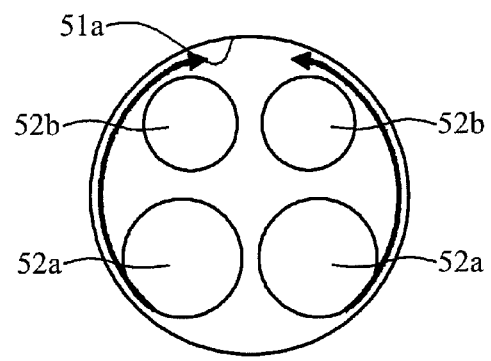
Figure 6B:
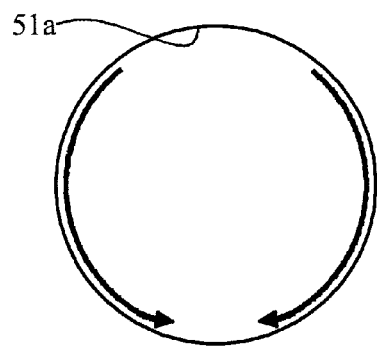
Figure 6D:
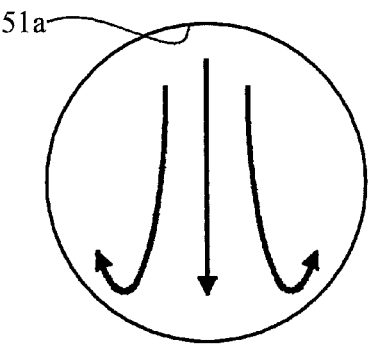

The first control unit executes a control to achieve the operation of the engine 50 according to the operation state of engine. The operation state of engine is classified into six regions D1 through D6 illustrated in FIG. 5 according to whether it is in a cold operation, or whether it is at the time of startup of the engine in addition to the rotation number of and the load on the engine 50.

In the cooling device 1, in view of the consistency and simplification of the control as a whole, the first control unit basically executes a control to drive the W/P 11 so that the discharge rate increases as the rotation number becomes high according to the rotation number of the engine 50, and a control to open partial flow rate adjusting valves 61 through 64 fully.

On the other hand, a control described hereinafter is executed to the flow rate adjusting valve 14. That is to say, the first control unit executes a control to close the flow rate adjusting valve 14 when the operation state of engine is in an idle state corresponding to the region D1, in a light-load state corresponding to the region D2, at the time of cold-operation of the engine corresponding to the region D5, or at the time of startup of the engine corresponding to the region D6.

When the operation state of engine is a low-rotation/high-load corresponding to the region D3, a control to close the flow rate adjusting valve 14 or to open the flow rate adjusting valve 14 in a manner with which the boiling of the cooling water in the cylinder head 52 can be suppressed (hereinafter, referred to as a boiling suppression manner) while the flow of the cooling water into the cylinder head 52 is suppressed. In addition, when the operation state of engine is a high-rotation/high-load corresponding to the region D4, a control to open the flow rate adjusting valve 14 fully is executed.

When executing a control to open the flow rate adjusting valve 14 in a boiling suppression manner, the first control unit may open the flow rate adjusting valve 14 at the minimum necessary opening degree at which the boiling of the cooling water can be suppressed in all conditions, or may detect or estimate the temperature of the cooling water flowing through the cylinder head 52 and open the flow rate adjusting valve 14 intermittently based on the temperature of the cooling water, or may open the flow rate adjusting valve 14 when the rotation number is equal to or greater than a given rotation number. According to this, when suppressing the cooling capacity of the cylinder head 52, it is possible to suppress the boiling of the cooling water and to prevent the flow rate adjusting valve 14 from being opened more than necessary.

In the cooling device 1, when the operation state of engine is a low-rotation/high-load, the flow rate of the cooling water flowing through the engine 50 is locally-decreased by the flow rate adjusting valve 14 decreasing the flow rate of the cooling water flowing through the cylinder head 52 as described above. Then, in the cooling device 1, in a case where the flow rate adjusting valve 14 is not fully opened, the cooling capacity of the cylinder head 52 is suppressed by suppressing the flow of the cooling water into the cylinder head 52. More specifically, in the cooling device 1, when the flow rate adjusting valve 14 is closed, or when the flow rate adjusting valve 14 is opened in the boiling suppression manner, the cooling capacity of the cylinder head 52 is suppressed.

The second control unit controls the TCV 57 according to the operation state of engine. More specifically, the second control unit controls the TCV 57 according to the rotation number of and the load on the engine 50. The ECU 70 stores opening degree map data, in which the opening degree of the TCV 57 is preliminarily set according to the rotation number of and the load on the engine 50, in the ROM 72. In the opening degree map data, the opening degree of the TCV 57 is set with respect to each region corresponding to the operation state of engine.

In the opening degree map data, the opening degree of the TCV 57 may be set with respect to each of regions D1 through D4 for example. The opening degree of the TCV 57 may be set to correspond to regions D5 and D6 for example. In this case, the second control unit may control the TCV 57 according to whether the operation state of engine is at the time of cold-operation of the engine corresponding to the region D5 and whether the operation state of engine is at the time of startup of the engine corresponding to the region D6. When executing a control according to the operation state of engine, the region of the operation state of engine of the first control unit may be different from that of the second control unit.

The third control unit feedback-controls the TCV 57 based on a parameter capable of indicating the flow velocity of air flowing through the inside of the cylinder so that the flow velocity of air flowing along the surface on the cylinder head 52 side becomes greater than the flow velocity of air flowing along the surface on the piston 53 side in a case where the flow velocity of air flowing along the surface on one of the cylinder head 52 side and the piston 53 side becomes greater than the flow velocity of air flowing along the surface on another side.

FIG. 6(*a*) through FIG. 6(*d*) are explanatory diagrams of a flowing manner of the tumble flow. FIG. 6(*a*) through FIG. 6(*d*) illustrate a flowing manner of the tumble flow in the vicinity of the top dead point in the compression stroke of the engine 50. FIGS. 6(*a*) and 6(*b*) illustrate a first flowing manner. FIGS. 6(*c*) and 6(*d*) illustrate a second flowing manner. FIGS. 6(*a*) and 6(*c*) illustrate a flowing manner of the tumble flow flowing through the cylinder head 52 side with a top view. FIGS. 6(*b*) and 6(*d*) illustrate a flowing manner of the tumble flow flowing through the piston 53 side with a top view.

In regard to the flowing manner of the tumble flow in the vicinity of the top dead point in the compression stroke, there is a case that the air flowing along the periphery exists on the piston 53 side and forms a main stream as illustrated in FIG. 6(*b*) while the air flowing along the surface exists on the cylinder head 52 side and forms a main stream as illustrated in FIG. 6(*a*). In addition, there is a case that the air flowing along the surface exists on the piston 53 side and forms a main stream as illustrated in FIG. 6(*d*) while the air flowing along the periphery exists on the cylinder head 52 side and forms a main stream as illustrated in FIG. 6(*c*).

A case that the flow velocity of air flowing along the surface on one of the cylinder head 52 side and the piston 53 side becomes greater than the flow velocity of air flowing along the surface on the other side is a case that a main stream flowing along the surface is generated on one of the cylinder head 52 side and the piston 53 side while a main stream flowing along the periphery is generated on the other side, specifically. The main stream flowing along the surface on one of the cylinder head 52 side and the piston 53 side becomes greater than the flow velocity of air flowing along the surface on the other side.

There is a case that the flowing manner of the tumble flow in the vicinity of the top dead point of the compression stroke greatly changes between these cases according to the operation state of engine. This is because the rotation number of the tumble flow changes as a result of the change of the condition of the intake air flowing into the cylinder because of the change of intake air amount in accordance with the operation state of engine.

When the main stream flowing along the surface exists on the piston 53 side, the air with a relatively high flow velocity flows along the surface of the piston 53 out of the cylinder head 52 and the piston 53. Therefore, the discharge of the spark plug 56 becomes difficult to be blown off. As a result, the primary blow-off voltage Vi becomes relatively small. On the other hand, when the main stream flowing along the surface exists on the cylinder head 52 side, the air with a relatively high flow velocity flows along the surface of the cylinder head 52 out of the cylinder head 52 and the piston 53. Therefore, the discharge of the spark plug 56 becomes easy to be blown off. As a result, the primary blow-off voltage Vi becomes relatively large.

Thus, there is a correlation between the primary blow-off voltage Vi and the existence of the air with a relatively high flow velocity flowing through the surface on the cylinder head 52 side out of the cylinder head 52 and the piston 53. On the other hand, the rotation number of the tumble flow has an affect on whether the air with a relatively high flow velocity flowing along the surface exists on the cylinder head 52 side out of the cylinder head 52 and the piston 53. The rotation number of the tumble flow can be changed by the TCV 57.

Therefore, the third control unit feedback-controls the TCV 57 based on the primary blow-off voltage Vi as the parameter capable of indicating the flow velocity of air flowing through the inside of the cylinder, specifically. In addition, when feedback-controlling the TCV 57, the third control unit feedback-controls the TCV 57 so that the primary blow-off voltage Vi becomes greater than a first given value Vi1 and smaller than a second given value Vi2.

In a case where the primary blow-off voltage Vi is equal to or smaller than the first given value Vi1, the third control unit controls the TCV 57 (to the direction in which the intake port 52*a* is closed) so that the opening degree of the TCV 57 becomes large. Then, the TCV 57 is controlled so that the flow velocity of intake air flowing into the cylinder becomes large. In this case, it is possible to cause the air with a high flow velocity to exist on the cylinder head 52 side by increasing the rotation number of the tumble flow.

Moreover, when the primary blow-off voltage Vi is equal to or greater than the second given value Vi2, the third control unit controls the TCV 57 (to the direction in which the intake port 52*a* is opened) so that the opening degree of the TCV 57 becomes small. Then, the TCV 57 is controlled so that the flow velocity of intake air flowing into the cylinder becomes small. In this case, it is possible to cause the air with a high flow velocity to exist on the cylinder head 52 side, and reduce the dispersion of the tumble flow by decreasing the rotation number of the tumble flow.

Figure 7:
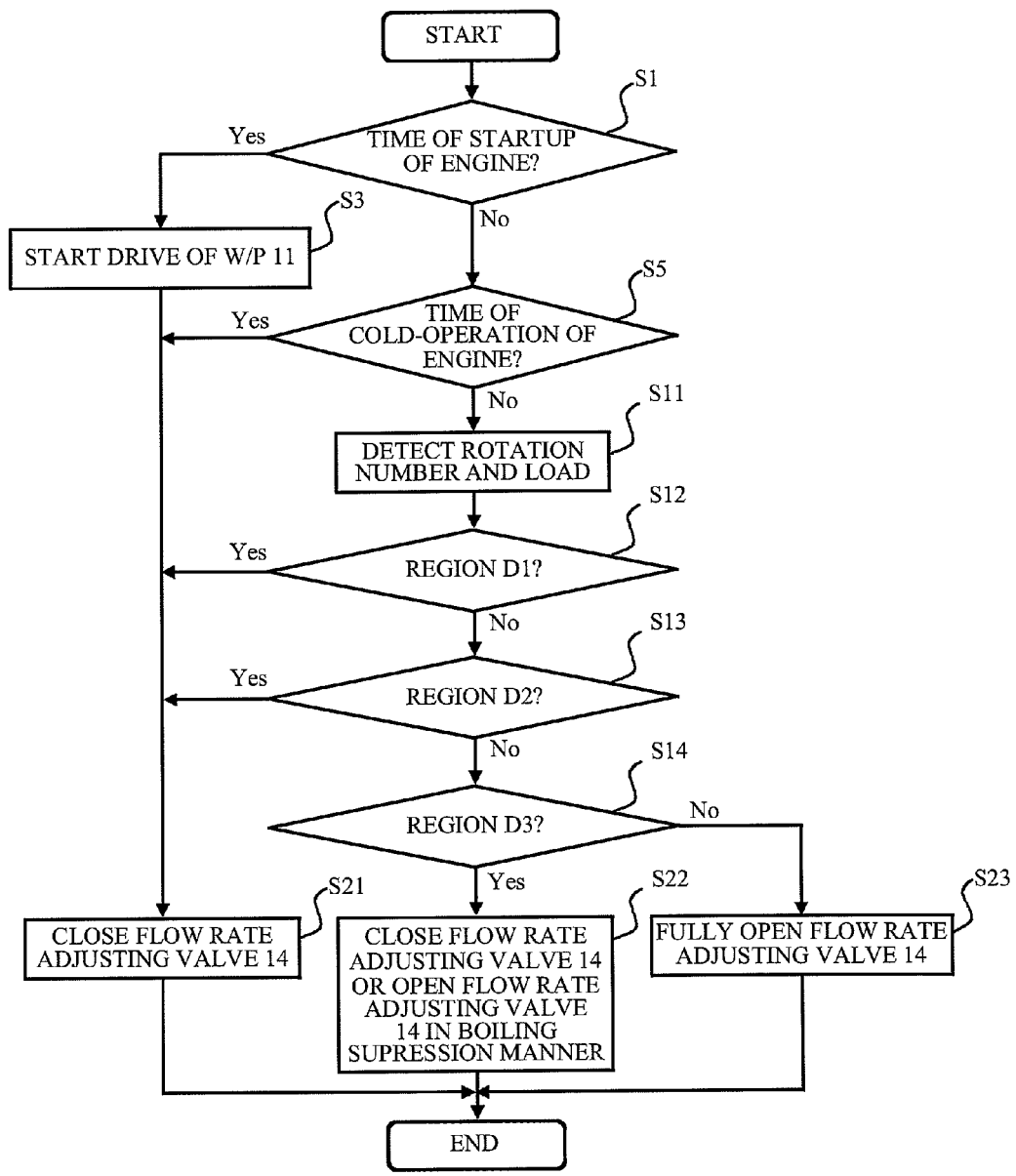
FIG. 7 is a diagram illustrating a flow control of cooling water with a flowchart.
Figure 8:
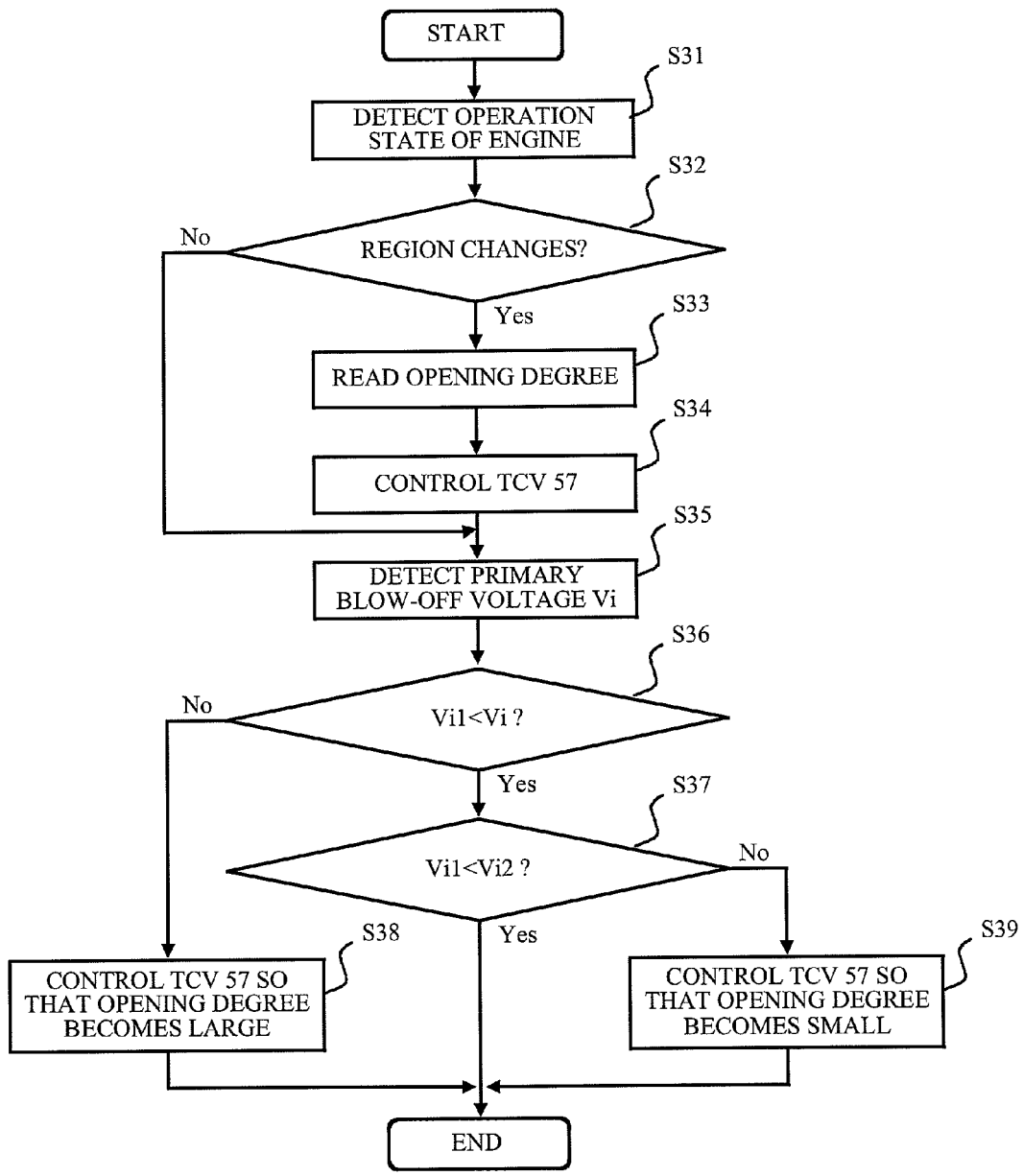
FIG. 8 is a diagram illustrating a control of a TCV with a flowchart.

A description will now be given of the operation of the ECU 70 with reference to flowcharts illustrated in FIG. 7 and FIG. 8. FIG. 7 illustrates a flow control of the cooling water with a flowchart, and FIG. 8 illustrates a control of the TCV 57 with a flowchart. As illustrated in FIG. 7, the ECU 70 determines whether it is at the time of startup of the engine (step S1). When the result is Yes, the ECU 70 starts the drive of the W/P 11 (step S3), and closes the flow rate adjusting valve 14 (step S21).

On the other hand, when the result is No in the step S1, the ECU 70 determines whether it is at the time of cold-operation of the engine (step S5). It can be determined whether it is at the time of cold-operation of the engine by determining whether the temperature of the cooling water is equal to or smaller than a give value (e.g. 75° C.). When the result is Yes in the step S5, the process goes to the step S21. On the other hand, when the result is No in the step S5, the ECU 70 detects the rotation number of and the load on the engine 50 (step S11).

Then, the ECU 70 determines the region corresponding to the detected rotation number and load (steps S12 through S14). More specifically, when the corresponding region is the region D1, the result of the step S12 becomes Yes and the process goes to the step S21, and when the corresponding region is the region D2, the result of the step S13 becomes Yes and the process goes to the step S21. On the other hand, when the corresponding region is the region D3, the result of the step S13 becomes Yes and the process goes to the step S22. At this time, the ECU 70 closes the flow rate adjusting valve 14, or opens it in the boiling suppression manner. In addition, when the corresponding region is the region D4, the result of the step S14 becomes No and the process goes to the step S23. At this time, the ECU 70 opens the flow rate adjusting valve 14 fully.

As illustrated in FIG. 8, the ECU 70 detects the operation state of engine (step S31). In the step S31, the ECU 70 detects the rotation number of and the load on the engine 50, specifically. Then, the ECU 70 refers to the opening degree map data based on the detected operation state of engine, and determines whether the region in which the detected operation state of engine is included changed (step S32).

When the result is Yes, the ECU 70 reads the corresponding opening degree from the opening degree map data based on the detected operation state of engine (step S33). In addition, the TCV 57 is controlled so that its opening degree becomes the read opening degree (step S34). The case that the region including the detected operation state of engine is determined after the start-up of the ECU 70 for the first time by referring to the opening degree map data based on the detected operation state of engine is included in a case that the region changed.

After the negative determination of the step S32, or after the step S34, the ECU 70 detects the primary blow-off voltage Vi (step S35). In addition, it is determined whether the detected primary blow-off voltage Vi is greater than the first given value Vi1 (step S36). When the result is No, the ECU 70 controls the TCV 57 so that the opening degree becomes large (step S38). In the step S38, the ECU 70 can control the TCV 57 so that the opening degree of the TCV 57 becomes large at a certain degree.

When the result is Yes in the step S36, the ECU 70 determines whether the primary blow-off voltage Vi is smaller than the second given value Vi2 (step S37). When the result is No, the ECU 70 controls the TCV 57 so that the opening degree becomes small (step S39). In the step S39, the ECU 70 can control the TCV 57 so that the opening degree of the TCV 57 becomes small at a certain degree. After the positive result of the step S36, or after the step 38 or the step S39, this flow chart is ended.

In the next routine, till the result of the step S32 becomes Yes, the TCV 57 is feedback-controlled so that the primary blow-off voltage Vi becomes greater than the first given value Vi1 and smaller than the second give value Vi2. In addition, when the result becomes Yes in the step S32, the TCV 57 is feedback-controlled after the opening degree is controlled to be the opening degree corresponding to the region of that time.

The ECU 70 may feedback-control the TCV 57 in a case where the region in which the detected operation state of engine is included is a given region (e.g. high-load). In this case, after the negative result of the step S32, or after the step S34, it is determined whether the region in which the detected operation state of engine is included is a given region, and when the result is Yes, the process may go to the step S35, and when the result is No, the flowchart may be ended.

Figure 9:
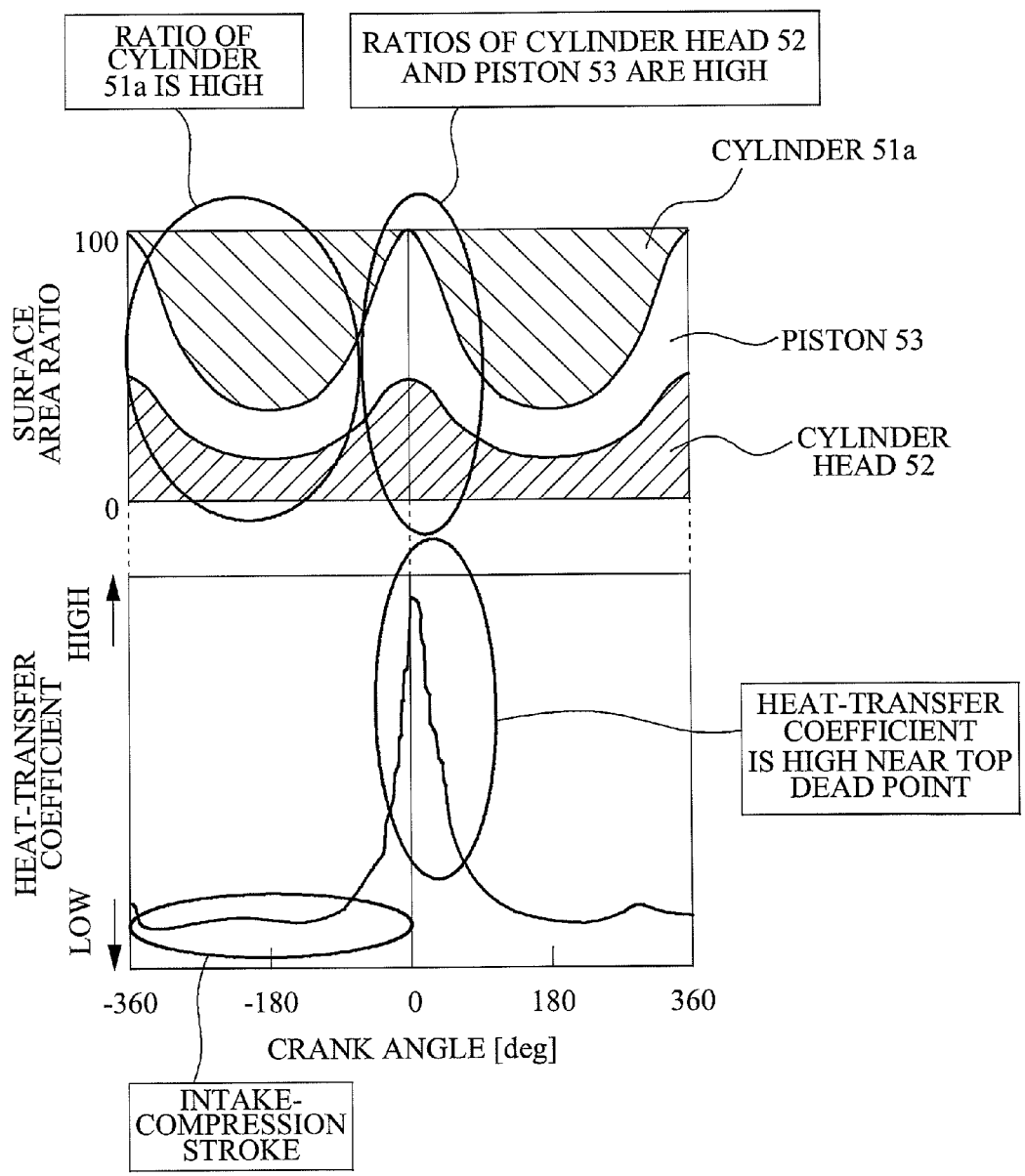
FIG. 9 is a diagram illustrating a heat-transfer coefficient and a surface area ratio of a combustion chamber.

A description will now be given of a function effect of the ECU 70. Here, the heat-transfer coefficient and the surface area ratio of the combustion chamber 55 according to the crank angle of the engine 50 are illustrated in FIG. 9. As illustrated in FIG. 9, the heat-transfer coefficient rises near the top dead point in the compression stroke. In regard to the surface area ratio, the surface area ratio of the cylinder head 52 and the piston 53 becomes large near the top dead point in the compression stroke.

Therefore, in regard to the cooling loss, the effect of the temperature of the cylinder head 52 is great. On the other hand, as the knocking depends on the temperature of the compression end, the surface area ratio of the cylinder 51a is large in the intake compression stroke which has an affect on the temperature of the compression end. Therefore, in regard to the knocking, the effect of the temperature of the cylinder 51a is great.

Based on such a knowledge, in the cooling device 1, when the operation state of engine is a low-rotation/high-load, the flow rate adjusting valve 14 is closed, or opened in the boiling suppression manner. According to this, as the flow rate of the cooling water flowing through the head-side W/J 521 is limited, it is possible to suppress the cooling capacity of the cylinder head 52, and as a result, the cooling loss can be reduced.

On the other hand, the occurrence of the knocking is concerned in this case. In the cooling device 1, the flow rate of the cooling water flowing through the head-side W/J 521 is limited by controlling the flow rate adjusting valve 14 that can suppress the cooling capacity of the cylinder head 52 without suppressing the cooling capacity of the cylinder block 51 while securing the cooling of the cylinder block 51. Therefore, in the cooling device 1, the cooling of the cylinder 51a can be maintained, and as a result, the occurrence of the knocking can be suppressed.

That is to say, in the cooling device 1, it is possible to insulate the heat of the cylinder head 52 (the reduction of the cooling loss) by locally changing the condition of the heat transfer in the reasonable manner based on above-described knowledge, and to suppress the occurrence of the knocking by cooling the cylinder block 51 at the same time. As described above, it is possible to suppress the occurrence of the cooling loss and secure the cooling performance of the engine 50 by achieving both the reduction of the cooling loss and the knock performance. As a result, the heat efficiency can be improved.

The engine 50 mounted in the above-described cooling device 1 is configured to be capable of securing the cooling of the cylinder block 51 and suppressing the occurrence of the cooling loss in the cylinder head 52. The ECU 70 can suppress the occurrence of the cooling loss properly as described hereinafter by considering the manner of heat release from the cylinder by the tumble flow.

Figure 10:
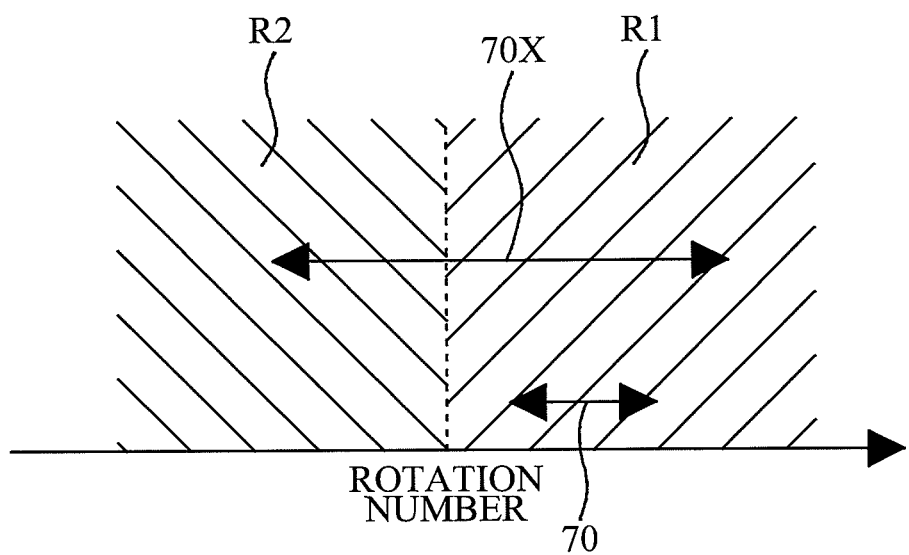
FIG. 10 is a diagram illustrating the dispersion of the rotation number of the tumble flow.

FIG. 10 is a diagram illustrating a dispersion of the rotation number of the tumble flow. In FIG. 10, a case that the TCV 57 is not feedback-controlled is also illustrated as the ECU 70X. In case of the ECU 70X, as the TCV 57 is not feedback-controlled, the rotation number of the tumble flow greatly varies according to the operation state of engine.

Thus, in case of the ECU 70X, the rotation number of the tumble flow varies from the region R1 where the air with a relatively high flow velocity flowing along the surface exists on the cylinder head 52 side out of the cylinder head 52 and the piston 53 through the region R2 where the air with a relatively high flow velocity flowing along the surface exists on the piston 53 side out of the cylinder head 52 and the piston 53.

On the other hand, the ECU 70 feedback-controls the TCV 57 so that the flow velocity of air flowing along the surface on the cylinder head 52 side becomes greater than the flow velocity of air flowing along the surface on the piston 53 side in a case where the flow velocity of air flowing along the surface on one of the cylinder head 52 side and the piston 53 side becomes greater than the flow velocity of air flowing along the surface on the other side. As a result, it is possible to suppress the dispersion of the rotation number of the tumble flow within the region R1. As a result, it is possible to suppress the heat release to the piston 53 from the cylinder by causing the air with a relatively high flow velocity to exist on the cylinder head 52 side, on which the reduction of the cooling loss is achieved, out of the cylinder head 52 and the piston 53.

That is to say, it is possible to suppress the occurrence of the cooling loss caused by the heat release to the piston 53 by causing the air with a high flow velocity speed and a relatively high heat-transfer coefficient to exist on the cylinder head 52 side, on which the occurrence of the heat release from the cylinder becomes difficult as a result of the reduction of the cooling loss, out of the cylinder head 52 and the piston 53. According to this, it is possible to suppress the occurrence of the cooling loss properly by suppressing the occurrence of the cooling loss as much as possible.

The ECU 70 can feedback-control the TCV 57 properly by feedback-controlling the TCV 57 based on the primary blow-off voltage Vi which has a correlation with the existence of the air with a relatively high flow velocity flowing along the surface on the cylinder head 52 side out of the cylinder head 52 and the piston 53. That is to say, according to this, the ECU 70 can suppress the occurrence of the cooling loss properly.

Furthermore, the ECU 70 can feedback-control the TCV 57 properly by feedback-controlling the TCV 57 so that the primary blow-off voltage Vi becomes larger than the first given value Vi1 and smaller than the second given value Vi2. That is to say, according to this, the ECU 70 can suppress the occurrence of the cooling loss properly.

As described above, the embodiment of the present invention is described in detail, but the present invention is not limited to this specifically described embodiment but may have various variations and alterations within the scope of the claimed invention.

For example, in the above-described embodiment, a description was given of a case that the engine 50 which is mounted in the cooling device 1 including the flow rate adjusting valve 14, which can secure the cooling of the cylinder block 51 and suppress the cooling capacity of the cylinder head 52, and the ECU 70 (corresponding to the first control unit) that executes a control to suppress the cooling capacity of the cylinder head 52 by controlling the flow rate adjusting valve 14 is an engine configured to be capable of securing the cooling of the cylinder block of the present invention and suppressing the occurrence of the cooling loss in the cylinder head.

However, the present invention is not limited to this, and the engine configured to be capable of securing the cooling of the cylinder block and suppressing the occurrence of the cooling loss in the cylinder head may be an engine where the heat insulation material (e.g. ceramics) that can suppress the heat release from the cylinder is provided to the cylinder head out of the cylinder block and the cylinder head and is provided to the part, which is exposed to the inside of the cylinder, of the cylinder head. In addition, it is preferable that such engine is further provided with a gasket with a high heat insulation (e.g. the gasket of which the surface is coated with rubber) between the cylinder block and the cylinder head.

In the above embodiment, a description was given of a case where the cooling device 1 in which the engine 50 is mounted forms the block-side W/J 511 (corresponding to a first cooling medium path) in the cylinder block 51, and the head-side W/J 521 (corresponding to a second cooling medium passage), which is mounted in the cooling medium circulation path different from the cooling medium circulation path in which the block-side W/J 511 is mounted, in the cylinder head 52, the flow rate adjusting valve 14 (corresponding to a cooling capacity adjustment unit) adjusts the cooling capacity of the cylinder head 52 by adjusting the flow rate of the cooling medium flowing through the head-side W/J 521, and the ECU 70 (corresponding to the first control unit) executes a control to suppress the cooling capacity of the cylinder head 52 by controlling the flow rate adjusting valve 14 in a case where the operation state of the engine 50 is a low-rotation/high-load.

However, the present invention is not limited to this, the cooling device may have a configuration described hereinafter for example. That is to say, the cooling device may be configured to form a first cooling medium path which flows the cooling medium in order of the cylinder block and the cylinder head in the portions on the exhaust sides of the cylinder block and the cylinder head, and form the second cooling medium path, which flows the cooling medium in order of the cylinder block and the cylinder head and is mounted in the cooling medium circulation path different from the cooling medium circulation path in which the first cooling medium passage is mounted, in the portions of the intake sides of the cylinder block and the cylinder head, the cooling capacity adjustment unit may be configured to adjust the cooling capacity of the cylinder head by adjusting the flow rate of the cooling medium flowing through the second cooling medium path, and the first control unit may be configured to execute a control to suppress the cooling capacity of the cylinder head by controlling the cooling capacity adjustment unit when the operation state of engine is low-rotation/high-load.

Even in this case, it is possible to configure the engine to secure the cooling of the cylinder block and suppress the occurrence of the cooling loss in the cylinder head. Moreover, in this case, it is possible to improve the reliability of the engine by forming the first cooling medium path out of the first cooling medium path and the second cooling medium path in the vicinity of the spark plug of the cylinder head.

The invention claimed is:

1. An engine control device mounted in an engine that includes a cylinder block, a cylinder head and a piston, and a tumble flow change unit which changes a tumble flow generated inside a cylinder, and is configured to be capable of securing a cooling of the cylinder block and suppressing an occurrence of a cooling loss in the cylinder head, wherein a spark plug is provided to the cylinder head to face the inside of the cylinder, the engine control device comprising:
  a control unit that feedback-controls the tumble flow change unit based on a discharge voltage when a discharge of the spark plug is blown off by the tumble flow generated inside the cylinder for the first time so that a flow velocity of air flowing along a surface on a cylinder head side becomes greater than a flow velocity of air flowing along a surface on a piston side.

* * * * *